(12) United States Patent
Wang et al.

(10) Patent No.: US 6,435,654 B1
(45) Date of Patent: Aug. 20, 2002

(54) COLOR CALIBRATION FOR DIGITAL HALFTONING

(75) Inventors: Shen-ge Wang, Fairport; Steven J. Harrington, Webster, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/479,208

(22) Filed: Jan. 7, 2000

Related U.S. Application Data

(63) Continuation-in-part of application No. 09/450,866, filed on Nov. 29, 1999, now abandoned.

(51) Int. Cl.[7] ................................................. B41J 2/21
(52) U.S. Cl. ........................... 347/43; 347/19; 358/504
(58) Field of Search ............................ 347/15, 43, 19, 347/115; 358/298, 300, 504, 518, 521

(56) References Cited

U.S. PATENT DOCUMENTS

| | | | |
|---|---|---|---|
| 5,469,167 A | | 11/1995 | Polge et al. ................. 342/25 |
| 5,493,321 A | * | 2/1996 | Zwadlo ...................... 347/131 |
| 5,598,272 A | * | 1/1997 | Fisch et al. ................. 358/298 |
| 5,649,073 A | | 7/1997 | Knox et al. ................. 395/109 |
| 5,748,330 A | | 5/1998 | Wang et al. ................. 358/298 |
| 5,854,882 A | | 12/1998 | Wang |
| 5,877,787 A | * | 3/1999 | Edge ............................ 347/19 |
| 6,027,201 A | * | 2/2000 | Edge ............................ 347/19 |

OTHER PUBLICATIONS

Shen-ge Wang et al. (1996) "Algorithm-Independent Color Calibration for Digital Halftoning", *The Fourth IS&T/SID Color Imaging Confrence*, 1996.

* cited by examiner

*Primary Examiner*—N. Le
*Assistant Examiner*—Lamson D. Nguyen
(74) *Attorney, Agent, or Firm*—Lahive & Cockfield, LLP

(57) ABSTRACT

The present invention provides methods and systems for halftone-algorithm independent calibration of a digital color printer to accurately predict the optical characteristic of color patches printed in the color printer. The present invention is based on 2-by-2 centering patterns where all dots printed are located at intersections of superimposable, virtual grid or coordinate. The present invention provides a further manipulation of the 2-by-2 patterns, which effectively considers the optical scattering in a printing medium. This consideration results in a printer model which possesses higher accuracy in predicting colors of halftone prints.

27 Claims, 9 Drawing Sheets

COLOR CALIBRATION FOR DIGITAL HALFTONING

This is a continuation in part of Ser. No. 09/450,866 filed Nov. 29, 1999, now abandoned.

BACKGROUND OF THE INVENTION

The present invention relates generally to a system and method for calibrating a digital color printer, such as an electrophotographic or ink-jet color printer, and more particularly relates to the use of digital halftone-algorithm independent techniques for characterizing the digital color printer.

Digital halftoning is a process of displaying continuous tone images in an output device such as a printer. Most conventional printers, such as ink-jet printers and electrophotographic "laser" printers, ultimately operate in a binary mode, which means that a printed dot is either present or absent at a specified location on a two-dimensional medium. Thus, prior to printing an image with the image output device, such as a digital color printer or digital color press, continuous-tone color images are halftoned into binary color input signals. The binary color input signals transmitted to a color printer describe the binary modes of colors for each printed dot. Typically in a digital color printer, these colors are cyan (C), magenta (M), and yellow (Y) or CMY plus black (K). For example, in a CMY digital color printer, a color dot is printed based upon the binary modes of CMY. Selected combinations of CMY may produce other colors, including red (R), green (G), blue (B) and black (K), or white (W) representing the absence of color. Thus, there are eight possible combinations of CMYRGBKW for each printed color dot.

Most color printers used today are calibrated prior to use. Calibration refers to the process of setting the threshold values of the color input signals transmitted to a color printer so that a given input color is well represented by the printed image. For example, if the input color signal is greater than the threshold value, a corresponding dot is printed. Otherwise, a dot is not printed. This calibration procedure is conducted every time the printing environment of the digital color printer is changed, for example, when the printer medium is changed. Also, in order to ensure a consistently high quality printer output, the calibration procedure can be conducted regularly, such as daily or weekly. In the calibration process, it is necessary to characterize the color printer to provide a set of data which is used to correct the threshold values of the color input signals. Thus, a series of color patches are printed on the medium with a color printer and an optical characteristic of the color patches is measured in order to characterize the color printer.

Currently almost all color calibration methods are halftone-algorithm dependent. Specifically, calibration conducted using one halftone algorithm can not be applied to another halftone algorithm without losing color accuracy. Halftone-algorithm independent calibration techniques for grey scale and color printers have been described in the art, but have not achieved high quality color reproduction. Examples of such techniques are described in the below cited patents and publications, the contents of which are hereby incorporated by reference.

U.S. Pat. No. 5,469,267, by the inventor hereof, describes a 2-by-2 halftone correction system for correcting digital image signals corresponding to a continuous tone image for the effects of printed dot overlap generated by a particular digital printer. The dot overlap correction is achieved by superimposing a virtual screen on the printer-generated dot patterns, such that the printer dots are entered at the orthogonal intersections of the lines defining openings in the screen. This centering approach allows for the determination of printed dot overlap by a 2-by-2 matrix, so that only seven test patterns are required for characterization of the printer and for dot overlap correction of halftone prints produced by the printer.

U.S. Pat. No. 5,748,330, also by the inventor hereof, describes a method of calibrating a digital printer using component test patches and the Yule-Nielsen equation. The technique for calibrating the hardware and software of a digital printer relies on making seven component test patches which completely characterize the printing system, and then measuring the actual reflectance of the seven test patches. The measured reflectances are then converted, by the Yule-Nielsen equation, to values representative of the ink area coverage characteristic of each component test patch, since ink area coverage is the parameter that can be directly controlled by the digital printer. This conversion step takes into account the non-linear relationship between the reflectance of a halftone area and the amount of ink area coverage on the halftone area.

U.S. Pat. No. 5,854,882 describes a halftone correction system for producing dot overlap corrected halftone images at a digital printer. The system is provided for producing dot overlap corrected halftone color images on a digital color printer. The system first calibrates the digital color printer with a set of color test patterns to provide halftone correction information. Next, multi-level digital color image signals representing a continuous-tone color image are received and stored. The system then halftones the multi-level digital color image signals to provide an overlap corrected halftone color image responsive to the halftone correction information at the digital color printer. The system may halftone the continuous-tone color image by either color error diffusion or ordered dithering techniques.

In addition to the U.S. patents described above, the article "Algorithm-Independent Color Calibration for Digital Halftoning," (Proceedings of IS&T/SID, 4th Color Imaging Conference, 1996), of which the present inventor is the author, describes a method based on measuring 2-by-2 pixel patterns which provide halftone algorithm independent color calibration for digital halftoning where the binary CMY(K) color signals corresponding to an image can be mapped into CIE XYZ color space at the printer resolution level. Therefore, any binary CMY(K) color images can be described as continuous tone images in standard color spaces. The teachings of this article are incorporated by reference.

The difference between the measured and the predicted optical characteristic of a test patch is an objective measurement of color difference in predicting output colors in a color printer. As shown in the article described above, the average difference between the measured and the predicted optical characteristics of 125 test patches by the 2-by-2 centering technique described above is around 5.0, and the maximum difference between the measured and the predicted optical characteristics of test patches among 125 samples is around 11.0. The above-described values of the average and the maximum differences between the measured and the predicted optical characteristics of the test patches are generally unsatisfactory and typically result in poorly reproduced color images. There is, thus, a need in the art to improve the average and the maximum differences in values between the measured and the predicted optical characteristic of test patches in order to more accurately predict the optical characteristics of test patches printed by the digital printer.

SUMMARY OF THE INVENTION

The present invention provides a method and system for calibration of a digital color printer to accurately predict the optical characteristic of color patches printed in the color printer. The present invention is based on measuring 2-by-2 pixel patterns to provide a halftone-algorithm independent characterization of a digital color printer, where all printed dots are located at intersections of a superimposable, virtual grid or coordinate system. The present invention provides a further manipulation of the 2-by-2 patterns to accurately predict the optical characteristic of selected test patches printed in a digital color printer, which effectively considers the optical scattering in a printing medium. As a result, the present invention provides for a printer calibration technique that more accurately predicts colors of halftone prints.

According to one aspect of the present invention, there is provided a method for calibrating a digital color printer. In the method, a plurality of elementary halftone color patches are created based on a 2-by-2 centering technique to provide a halftone-algorithm independent characterization of a digital color printer. In the 2-by-2 technique, each of the elementary halftone color patches represents a pattern of dots relative to a virtual, superimposable grid. An optical characteristic, such as reflectance, of the elementary halftone color patches printed on a medium by the printer is measured. After the optical characteristic of the elementary halftone color patches is measured, the measured characteristic is compensated for by a selected value associated with at least the medium. As a result, an optical characteristic of one or more arbitrary halftone color patches created according to a halftone algorithm can be predicted based on the compensated optical characteristics of the elementary halftone color patches.

According to another aspect of the present invention, there is provided a system for calibrating a digital color printer. The system operates based on a plurality of elementary halftone color patches created according to 2-by-2 patterns which provide a halftone-algorithm independent characterization of a digital color printer. In 2-by-2 patterns, each of the elementary halftone color patches represents a pattern of dots relative to a virtual, superimposable grid. The optical characteristic of elementary halftone color patches printed on a medium is measured and stored in look up tables. The optical characteristic of the elementary halftone color patches stored in the look up tables is converted by a compensation value that considers the optical characteristics of at least the medium. Consequently, an optical characteristic of arbitrary halftone color patches created according to a halftone algorithm can be calculated based on the compensated optical characteristic of the elementary halftone color patches.

According to the present invention, the accuracy in predicting the optical characteristic of arbitrary halftone color patches is improved by considering the optical scattering in the medium. The accuracy can be defined as the average of the difference between the measured and the predicted optical characteristic of test patches and the maximum difference between the measured and the predicted optical characteristic of test patches. Hence, according to the present invention, the accuracy in predicting the color output of a particular color printer has been improved from 4.9 and 12.4 to 3.0 and 5.8, respectively, by considering the optical scattering of the medium and by providing a compensated value. As a result, the calibration of the color printer can be performed with high efficiency and can achieve accurate full-scale color reproduction of input images because of the improved accuracy in predicting the optical characteristic of the halftone color output of the printer.

BRIEF DESCRIPTION OF THE DRAWINGS

An illustrative embodiment of the present invention will be described below relative to the following drawings.

DESCRIPTION OF THE ILLUSTRATED EMBODIMENT

Figure 1:
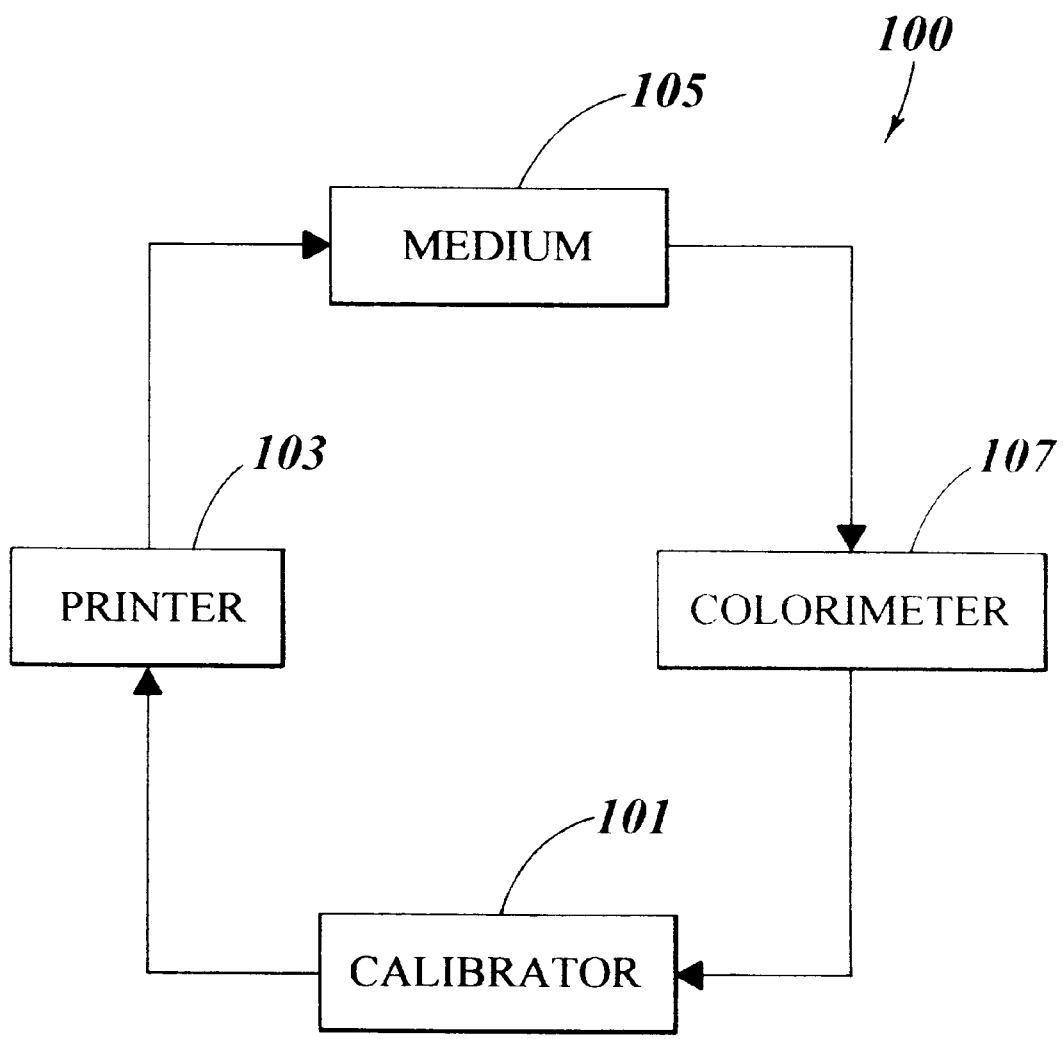
FIG. 1 is a schematic block diagram of a system for calibrating a digital color printer according to the teachings of the present invention.

The present invention provides for a system and method for calibrating a digital color printer by employing a 2×2 centering technique to derive a set of elementary halftone color patches which provide a halftone-algorithm independent characterization of a digital color printer. The set of elementary halftone color patches are transmitted to the color printer as binary image input signals. The printer then prints the elementary halftone color patches on a particular medium with selected ink. Once placed on the medium, a particular optical characteristic, such as reflectance, of the elementary halftone color patches is measured using any suitable measuring instrument, such as a calorimeter. The calorimeter measures the optical characteristic of the elementary halftone color patches. The measured optical characteristic can be expressed in tri-stimulus values, which are stored in a first storage element.

In order to determine the expected or predicted optical characteristic of a subsequently printed image by the digital color printer, certain selected parameters associated with the printing process need to be determined. The present invention can be employed to adjust or vary the measured tri-stimulus values associated with the elementary halftone color patches to compensate for the particular type of print medium or ink employed by the digital color printer. The present invention can adjust, correct or compensate for the optical characteristics of the medium by adjusting, correcting or varying the stored measured optical characteristic values of the elementary halftone color patches by a selected compensation value. The adjusted or compensated values are then stored in a second storage element.

The present invention further provides for the selection of a set of arbitrary halftone color patches generated by halftoning arbitrary color input values. The arbitrary halftone color patches are then parsed into a plurality of elementary halftone color patches. The expected or predicted optical characteristic of the arbitrary halftone color patches can be calculated by employing the adjusted or compensated optical characteristic values associated with the elementary halftone color patches. The arbitrary halftone color patches are then printed by the digital color printer on the medium, and an optical characteristic of the printed arbitrary halftone color patches is measured by the calorimeter. The measured optical characteristic of the printed arbitrary halftone color patches is then compared with the calculated optical characteristic of the arbitrary halftone color patches to determine the difference therebetween. Specifically, the present invention provides for adjusting, varying or correcting the calculated optical characteristic value of the elementary halftone color patches in order to minimize the error from the measured value. This will allow better prediction of the color actually printed and may be used to enhance the image quality printed by the digital color printer.

Since color calibration is generally required for each color printer and for each different printer medium, the present invention provides for a color printer calibration technique that employs a 2-by-2 centering technique and an optical scattering compensation technique. FIG. 1 is a schematic block diagram of a printing system 100 for calibrating a digital color printer according to the teachings of the present invention. The illustrated printing system 100 includes a calibrator 101 for generating elementary halftone color patches according to a 2-by-2 centering technique which provide a halftone-algorithm independent characterization of a printer 103. After the color patches are printed on a medium 105 with the printer 103, an optical characteristic of the elementary halftone color patches printed on the medium 105 are measured by a calorimeter 107 and transferred back to the calibrator 101. The calibrator 101 converts the measured optical characteristic of the elementary halftone color patches into color values while concomitantly considering the optical scattering caused by the medium. This is illustratively represented by the input compensation value $\gamma$, which can be varied or adjusted as a function of the printer medium and/or ink in order to more closely match the predicted optical characteristics of the color patches with the actually measured patches. The $\gamma$ values can be stored in any suitable storage element, such as a table. The calibrator 101 also stores the converted optical characteristic of the elementary halftone color patches in an appropriate storage device, such as a Random Access Memory (RAM), an Electrically Erasable Programmable Read Only Memory (ROM), a Flash Memory, or like storage devices.

The calibrator 101 generates arbitrary halftone color patches in accordance with the halftone algorithm of the printer 103. The calibrator 101 calculates the optical characteristics of a number of arbitrary halftone color patches by summing the optical characteristics of the elementary halftone color patches that are included in the arbitrary halftone color patch. The calibrator 101 generates image signals that are transferred to the printer 103, which in turn prints the arbitrary halftone color patches on the medium 105. The optical characteristics of the arbitrary halftone color patches printed on the medium 105 are measured by the colorimeter 107 in order to determine the difference between the calculated optical characteristic of an arbitrary halftone color patch and the measured optical characteristic of the arbitrary halftone color patch. While the calibrator 101 and the printer 103 are illustrated as being separate from each other in FIG. 1, those skilled in the art will appreciate that the calibrator 101 can be included in the printer 103. Furthermore, the ordinarily skilled artisan will appreciate that the colorimeter 107 can also be included in the printer 103, if desired, in order to automatically calibrate the color printer. Hence, the resulting printing system 100 can be an integrated printing system.

The printer 103 of the present invention can include any conventional printer or copying system, including electrophotographic and ink-jet printing systems, as well as other traditional printing and copying systems. According to one practice, the printer 103 is a digital color printer.

The accuracy in predicting the color output of a set of arbitrary halftone color patches is improved by considering the optical scattering associated with the medium and by compensating for this scattering by adjusting, correcting or varying the measured optical characteristic of a set of elementary halftone color patches with the compensation value or adjustment parameter $\gamma$. The calibration of the printer 103 can be performed with high efficiency because of the improved accuracy in predicting the color output of the color printer.

In general, assuming an idealized color printer, the calibration of the idealized color printer is relatively straightforward. The idealized printer is expected to print all dots in perfect square shapes, and to create no overlapping between adjacent dots. FIG. 2A is an example of a halftone color patch generated by an idealized printer which illustrates perfect square shaped dots with no overlapping between adjacent dots. Four different pixels used in the halftone pattern are shown as perfect squares. Since a CMY halftone color printer has eight possible color outputs, cyan (C), magenta (M), yellow (Y), red (R), green (G), blue (B), black (K) and white (W), eight patches printed with eight different solid colors can be measured and can be used to accurately describe any color pixel combinations.

A conventional color printer is, however, different from the idealized color printer. FIG. 2B is an example of a halftone patch generated by a physical color printer which illustrates circular color dots with overlapping between adjacent dots. Typically all dots printed by actual halftone printers are not perfect squares and adjacent dots tend to overlap each other. This overlap is a characteristic of each color printer because different printers or the same printer using different types of media produce differently shaped and sized dots which result in different amounts of overlapping. The illustrated dots are shown and shaded for color, with artistic license being taken with regard to illustrating the overlapping regions, which are merely shown for purpose of clarity. Those of ordinary skill will readily recognize that the overlapping color dots can create other colors consistent with standard color techniques. This artistic license is carried through for all FIGURES showing the overlapping color regions of the halftone patches.

In addition, the dots generated by conventional color printers are located at the center of the square pixel defined as the idealized output. The average optical color characteristic of each square pixel depends not only on the dot centered at the center of the particular pixel, but also on the surrounding dots. In the overlapping model shown in FIG. 2B, at least eight immediate neighbors are shown. Since each dot has eight possible colors, the total number of all possible combinations in a three-by-three dot structure is given by $8^9$, or 134,317,728. This exceedingly large number of possible color patterns in the three-by-three dot structure is too large to effectively calibrate an actual color printer. For the purpose of overcoming this problem, a 2-by-2 centering technique, such as that set forth in U.S. Pat. No. 5,469,267 and U.S. Pat. No. 5,854,882, which were previously incorporated by reference, performs halftone-algorithm independent gray-scale and color calibration by using this 2-by-2 centering technique.

Figure 2C:
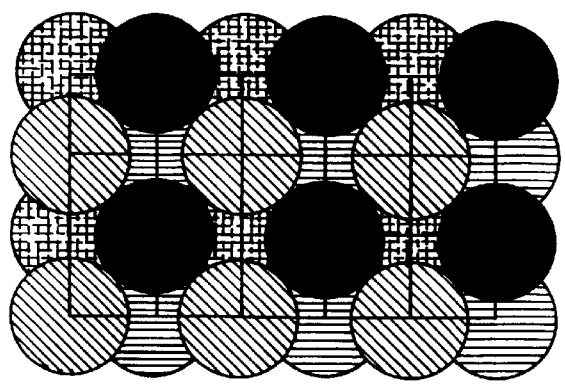
FIG. 2C is a halftone patch generated by a color printer which employs a 2-by-2 centering technique relative to the conventional technique shown in FIG. 2B, with artistic license being taken with regard to representing the color of the overlapping regions.
Figure 2B:
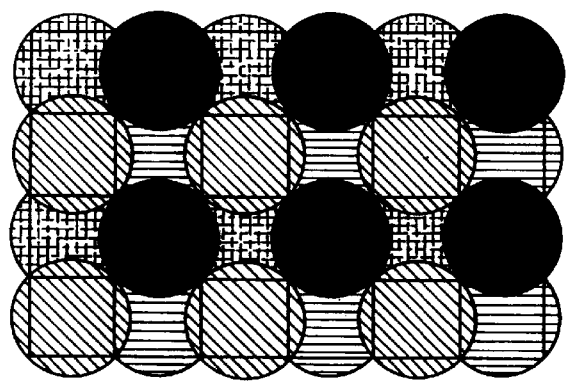
FIG. 2B is a halftone patch generated by a digital color printer which illustrates circular dots with overlapping between adjacent dots, with artistic license being taken with regard to representing the color of the overlapping regions.
Figure 2A:
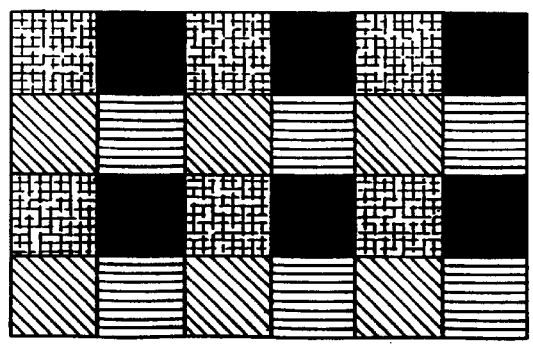
FIG. 2A is a halftone patch generated by an idealized color printer which illustrates perfect square shaped dots with no overlapping between adjacent dots.

FIG. 2C is an example of a halftone patch generated by a color printer shown in black and white which illustrates the 2-by-2 centering technique relative to FIG. 2B. The same dot pattern shown in FIG. 2B is associated with a shifted coordinate system, so that each dot is now located at one cross point of the coordinate system. The optical color characteristic of each square pixel can be fully specified by the four dots located at the corners of each pixel. Therefore the total number of all overlapping possibilities can be reduced to effectively calibrate a color printer.

Figure 3:
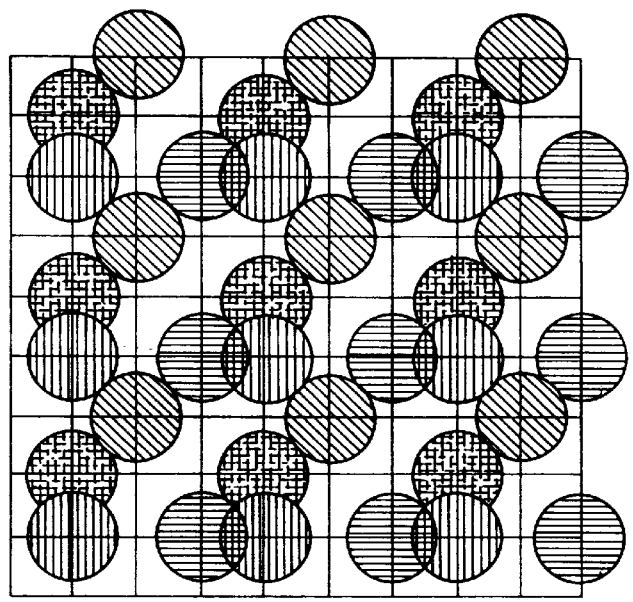
FIG. 3 is a halftone patch superimposed by a virtual grid to illustrate the 2-by-2 centering technique, with artistic license being taken with regard to representing the color of the overlapping regions.

FIG. 3 is another example of a halftone color patch superimposed with a grid (not part of the patch) which illustrates the 2-by-2 centering technique. The physical output of the color printer, as shown by the dots, are aligned by a virtual coordinate system shown as a grid. The virtual coordinate or grid is defined such that all dots are located at intersections of the horizontal and the vertical axes of the grid, instead of at the centers of the square areas, or pixels, defined by the grid. Considering each dot has eight possible color inputs, cyan (C), magenta (M), yellow (Y), red (R), green (G), blue (B), black (K) and white (W), for a CMY color printer, the total number of all possible 2-by-2 centering structure, or 2-by-2 overlapping patterns, is given by $8^4$, or 4096.

Figure 4A:
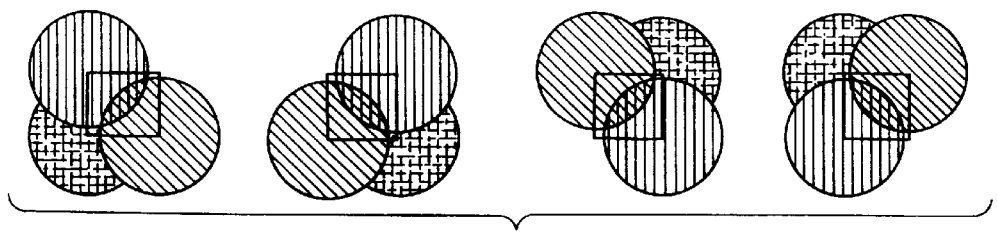
FIG. 4A illustrates four different overlapping patterns of the halftone patches of FIG. 3, which are mirror images of each other, with artistic license being taken with regard to representing the color of the overlapping regions.
Figure 4B:
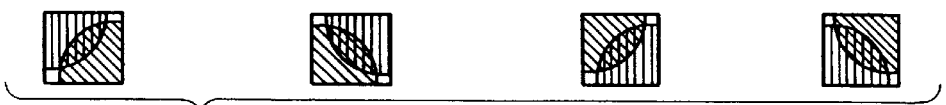
FIG. 4B, illustrates four different overlapping patterns having the same average optical color characteristic, with artistic license being taken with regard to representing the color of the overlapping regions.

Assuming that all dots have shapes symmetric about both the vertical and the horizontal axes, for example, circle or ellipses, many overlapping patterns are mirror images of others. FIG. 4A is an example of four different overlapping patterns of color dots which are mirror images of each other. Consequently, the average optical color characteristic of the four overlapping structures inside the square pixels, shown in FIG. 4B, are identical. With this symmetry consideration, those skilled in the art will readily appreciate that there are only 1072 independent overlapping structures in terms of average color appearance (e.g., optical color characteristic). All of these colors can be directly measured from 1072 2-by-2 patches.

The 1072 color patches producible by the printer 103 are referred to herein as the elementary halftone color patches, since any halftone color patch can be expressed as a combination of one or more of the 1072 elementary halftone color patches. As will be described in detail below, any type of halftone pattern subsequently generated by the printer 103 can be described as a combination of elementary halftone color patches. That is, only 1072 elementary halftone color patches are required to completely describe the printer 103.

Figure 5:
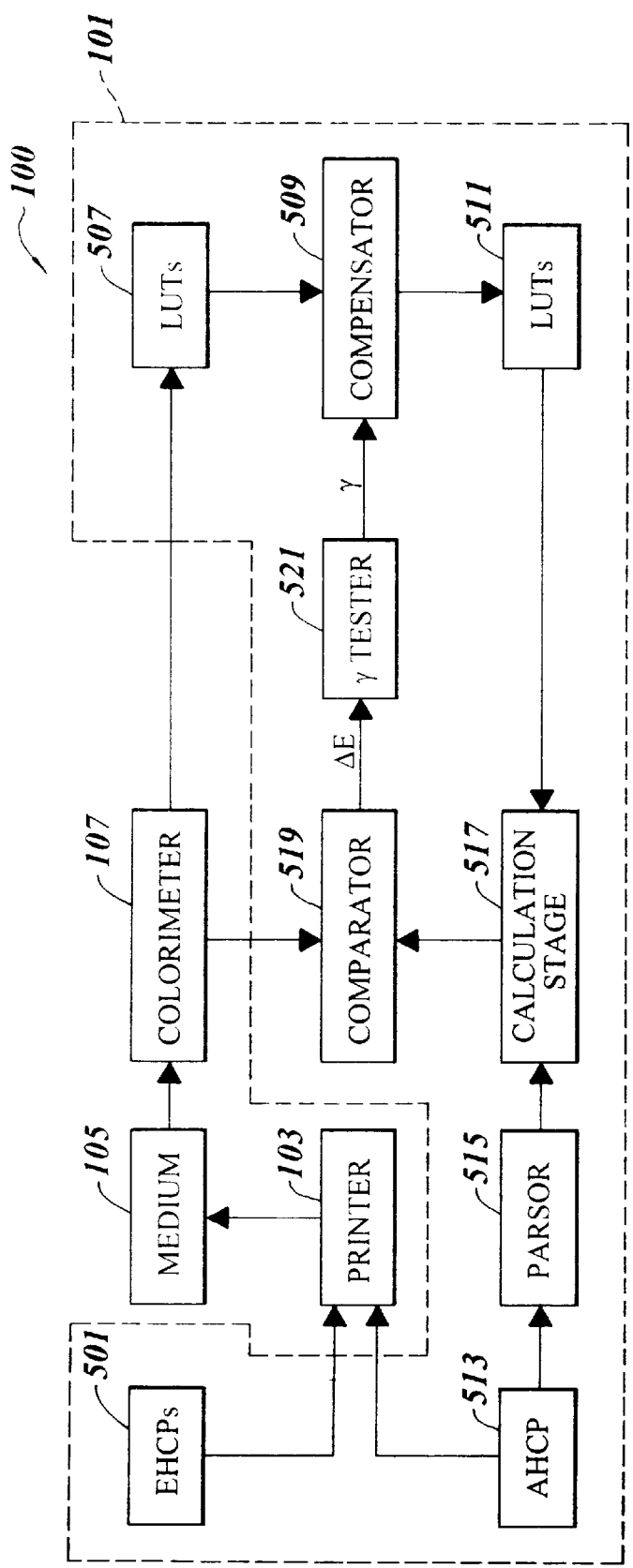
FIG. 5 is a schematic block diagram of a calibration system for predicting an optical characteristic of an image or test patches printed by a color printer on a selected medium in accordance with the teachings of the present invention.

FIG. 5 is a schematic block diagram of the printing system 100 of FIG. 1 illustrating in more detail the operation, function and structure of the calibrator 101. Like reference numerals are used to designate like parts throughout the FIGS. The printing system 100 operates based on a set of elementary halftone color patches, such as those described above, to provide halftone algorithm-independent characterization of a digital printer. Since all the pixels in the elementary halftone color patches are specified by the dots located at the corners of the pixel, the elementary halftone color patches can be generated regardless of the halftone algorithm associated with the printer 103 to characterize the printer 103. The illustrated printing system 100 of the present invention will be described below relative to 1072 elementary halftone color patches (EHCPs) 501 in CMY color space. Nevertheless, those of ordinary skill in the art will appreciate that the present invention can be practiced with a 2-color or 4-color printer as well as a 3-color CMY printer. Those of ordinary skill in the art will also appreciate that other sets of elementary halftone color patches can be generated in a 2-color or 4-color printer.

A set of 1072 elementary halftone color patches 501 are generated by the 2-by-2 centering technique and printed by the printer 103 on a medium 105 in color. The 1072 elementary halftone color patches can be produced by the printer 103, such as by the XEROX 5790™ color laser printer in 400-by-400 DPI mode, and need not be reproduced herein. The binary signals are independent of the halftone algorithm of the printer 103. For all distinct patterns of the elementary halftone color patches, the binary signals of the halftone patches are input to the digital color printer regardless of the halftone algorithm. The printed color patches periodically repeat their corresponding 2-by-2 dot patterns in both horizontal and vertical directions. Each printer is characterized by its particular output of these color patterns.

The optical characteristic of each elementary halftone color patch printed on the medium 105 is measured by the colorimeter 107. The optical characteristic of a color patch can be expressed by either reflectance or transmission spectra. The embodiment of the present invention further expresses the optical characteristic of a color by CIE color space values. The resulting response of the colorimeter 107 to the elementary halftone color patches can be expressed in CIE XYZ tri-stimulus values. The measurement can also be performed in any other suitable color space. Those skilled in the art will appreciate that the measured values of the optical characteristics of the elementary halftone color patches can also be expressed in RGB, CIE L*a*b*, or any other CIE color space value, depending upon the appropriate choice of input parameters to the colorimeter 107.

A color space is a method by which color can be specified. The CIE XYZ color space was developed by Commission Internationale de l'Eclairage (CIE) to display all colors which can be perceived by the human eye within its color space. Since any color that the human eye can perceive can be regarded as a mixture of red, green and blue, the primary colors or stimuli, the CIE employs the individual data points of a spectrum to estimate the proportions of the primary colors which constitute the color. The result is three values, the tri-stimulus values X(red), Y(green) and Z(blue), which are often scaled to have values of 0 for a black object and 1000 for a white or colorless object. In the CIE XYZ color system, the red components of a color are along the x (horizontal) axis of the coordinate plane and the green components are along the y (vertical) axis. The primary colors XYZ on which the CIE color standard is based are imaginary and do not exist physically. These virtual primary colors have been selected so that all colors which can be perceived by the human eye lie within the color space. In CIE L*a*b* color space, brightness is added to color because color is not defined fully by its chromaticity (x and y). A brightness coefficient also needs to be specified in CIE L*a*b* color space. A color is only described in full if it contains the values x and y plus the brightness coefficient.

With many existing printer models, the output of a CMY color printer is described as a linear or nonlinear combination of eight elemental colors, cyan (C), magenta (M), yellow (Y), red (R), green (G), blue (B), black (K) and white (W). Neugebauer's equation is a color-predicting basic function which defines the relationship between the XYZ and CMY calorimetric systems in the CIE common color space. By using Neugebauer's equation, the printer can describe the output color in CIE XYZ color space according to the following equations:

$$X = a_c X_c + a_M X_M + \ldots + a_W X_W \quad (1x)$$

$$Y = a_c Y_c + a_M Y_M + \ldots + a_W Y_W \quad (1y)$$

$$Z = a_c Z_c + a_M Z_M + \ldots + a_W Z_W \quad (1z)$$

In equations 1x–1z, the (X, Y, Z) values are the tri-stimulus values of the output color in CIE XYZ color space. Further, $a_c$ and $(X_c, Y_c, X_c)$ are the area ratio and the tri-stimulus values of cyan, and so on for the other elemental colors. Since the CIE XYZ calorimetric system has a one-to-one correspondence to the CIE L*a*b* calorimetric system, those skilled in the art will appreciate that the Neugebauer's equation can also be defined as an equation indicative of the relation between the L*a*b* calorimetric system and CMY calorimetric system.

Figure 6:
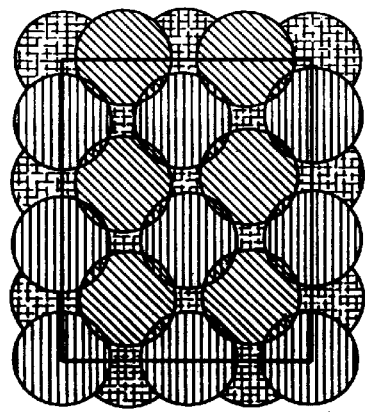
FIG. 6 is an example of a halftone patch generated by a color printer having only one basic overlapping structure and corresponding mirror images, with artistic license being taken with regard to representing the color of the overlapping regions.

Due to dot overlapping in physical color printers, the exact area ratios of cyan (C), magenta (M), yellow (Y), red (R), green (G), blue (B), black (K) and white (W) are difficult to determine using the above equations 1x–1z, especially for a small area close to the printer resolution level. With the 2-by-2 centering technique, all 1072 elementary halftone color patterns can be considered as independent element colors. For example, the entire halftone color patch shown in FIG. 6 consists of only one basic structure and its mirror images, as shown in FIG. 4B. Based on the 1072 elementary halftone colors, the average optical characteristic of any CMY dot combination can be described according to the following equations:

$$X = \Sigma a_i X_i \quad (2x)$$

$$Y = \Sigma a_i Y_i \quad (2y)$$

$$Z = \Sigma a_i Z_i \quad (2z)$$

In equations 2x–2z, $a_i$ and $(X_i, Y_i, X_i)$ are the area ratio and the tri-stimulus values of 1072 elementary halftone color patches in a 2-by-2 overlapping pattern. Since the area ratio can be counted as a number of pixels in 2-by-2 overlapping structures, equations 2x–2z may also be written as follows:

$$X = \Sigma n_i X_i / N \quad (3x)$$

$$Y = \Sigma n_i Y_i / N \quad (3y)$$

$$Z = \Sigma n_i Z_i / N \quad (3z)$$

In equations 3x–3z, N is the total number of pixels in the 2-by-2 overlapping structure and $n_i$ is the total number of occurrences of each basic 2-by-2 overlapping pattern and all corresponding symmetric images. As a result, if the optical characteristic of each elementary halftone color pattern is measured, the optical characteristic of any visual arbitrary halftone color may be calculated by summing the optical characteristic of the elementary halftone color patches which are included within the area of the arbitrary halftone color patch.

The measured optical characteristic (e.g., reflectance) of 1072 elementary halftone color patches are stored in a first storage device, such as the Look Up Tables (LUTs) 507. The stored optical characteristic in the first LUTs 507 can be repeatedly used to calculate the optical characteristic of any arbitrary halftone color patch.

Before the optical characteristic of the elementary halftone color patches stored in the first LUTs 507 are used to calculate the optical characteristic of any arbitrary halftone color patch, the optical characteristic of the elementary halftone color patches stored in the first LUTs 507 are compensated by a compensator 509 to consider the optical characteristic of the medium 105. The compensator 509 compensates for the optical properties of the medium in order to enhance the accuracy or ability to predict the optical characteristics of any arbitrary halftone color patch generated by the printer. The measured optical characteristic of the elementary halftone color patches stored in the first LUTs 507 are converted to compensated values which consider the optical scattering in the medium by the choice of the compensation value or adjustment parameter $\gamma$. For example, tri-stimulus values $X_i$, $Y_i$, $Z_i$ of the elementary halftone color patches stored in the first LUTs 507 are converted to values $X_i^{\gamma x}$, $Y_i^{\gamma y}$, $Z_i^{\gamma z}$ according to compensation value $\gamma$ ($\gamma_x$, $\gamma_y$, $\gamma_z$). For this purpose, the compensation value $\gamma$ is input to the compensator 509. The compensation value $\gamma$ inputted to the compensator 509 also considers the type of ink which is used to print halftone color patches on the medium. The theoretical background of the compensation is described below in detail.

In U.S. Pat. No. 5,748,330, the contents of which are incorporated by reference, an application of the Yule-Nielsen equation to a 2-by-2 Black/White (B/W) printer model for compensating optical dot gain due to the scattering in a medium was described. The Yule-Nielsen equation for a B/W printer is given by the following equation:

$$r^{1/n} = (1-a) r_p^{1/n} + a\, r_i^{1/n} \quad (4)$$

In equation 4, $r_p$ and $r_i$ are the reflectance by the medium itself and the medium completely covered by the ink, respectively. In addition, a is the fraction of area covered by the ink, and r is the resulting reflectance. The parameter n can be considered as a constant and its value depends on the optical properties of the medium and ink.

The application of the Yule-Nielsen equation to equations 2x–2z modifies the equations 2x–2z as follows:

$$X^{\gamma x} = \Sigma a_i X_i^{\gamma z} \quad (5x)$$

$$Y^{\gamma_y} = \Sigma a_i Y_i^{\gamma_y} \quad (5y)$$

$$Z^{\gamma_x} = \Sigma a_i Z_i^{\gamma_z} \quad (5z)$$

In equations 5x–5z, $a_i$ and ($X_i^{\gamma_x}$, $Y_i^{\gamma_y}$, $Z_i^{\gamma_z}$) are the area ratio and the tri-stimulus values of each elementary halftone color patch in a 2-by-2 overlapping pattern considering optical scattering in the medium. Since the area ratio $a_i$ can be counted in numbers of pixels in 2-by-2 overlapping structures, equations 5x–5z may also be written as follows:

$$X^{\gamma_x} = \Sigma n_i X_i^{\gamma_x}/N \quad (6x)$$

$$Y^{\gamma_y} = \Sigma n_i Y_i^{\gamma_y}/N \quad (6y)$$

$$Z^{\gamma_z} = \Sigma n_i Z_i^{\gamma_z}/N \quad (6z)$$

In equations 6x–6z, N is the total number of pixels in the 2-by-2 overlapping structure, $n_i$ is the total number of occurrences of each elementary halftone color patch in the 2-by-2 overlapping patterns and all corresponding symmetric images, and γ is the compensation value. As a consequence, the optical characteristic of any visual arbitrary color can consider the optical scattering of the medium by summing the compensated tri-stimulus values (e.g., optical characteristics of the elementary halftone color patches) which are included within the area of the arbitrary color patch. This arithmetical operation can be performed by the calculation stage 517 in accordance with equations 6x–6z.

As an alternative application of the Yule-Nielsen equation, the output color of a particular printer can be expressed in spectral reflectance, which is given by the following equation:

$$r(\lambda)^{\gamma_z} = \Sigma n_i r_i(\lambda)^{\gamma_z}/N \quad (7)$$

In equation 7, r(λ) is the spectral reflectance. The stimulus values (X, Y, Z) of the elementary halftone color patches can be calculated from the measured spectral reflectance using well known relationships between the reflectance and the tri-stimulus values of an color patch. With the spectral reflectance application, a color is accurately expressed by a mass of data contained in the reflectance spectra. On the other hand, the spectral reflectance application employs calculation steps to manage the data contained in the reflectance spectra.

The scattering compensation values ($\gamma_x$, $\gamma_y$, $\gamma_z$) are parameters that vary with the printing medium and ink of specific color printers, and can be determined by the equation 5x–5z and 6x–6z when employing selected halftone patches, which can be any combination of the 1072 elementary patterns.

A method of determining the optimal compensation value γ will now be described. The compensator 509 converts the measured optical characteristic or tri-stimulus values ($X_i$, $Y_i$, $Z_i$) of the elementary halftone color patches stored in the first LUTs 507 to compensated values ($X_i^{\gamma_x}$, $Y_i^{\gamma_y}$, $Z_i^{\gamma_z}$) which consider the optical scattering in the medium to enhance the ability to predict the optical characteristic of any arbitrary halftone color patch. The amounts ($\gamma_x$, $\gamma_y$, $\gamma_z$) are generated by a C-tester 521 that will then determine how well they serve to predict optical characteristics of the ink on the medium. By trying many possible γ values, the tester 521 can determine the optimal value. The compensated optical characteristic of the elementary halftone color patches are used to predict the color of an arbitrary halftone color patch. For the purpose of using the compensated optical characteristic of 1072 elementary halftone color patches when calculating the optical characteristic of an arbitrary halftone patch, the compensated optical characteristics or tri-stimulus values of the 1072 elementary halftone color patches can be stored in a second storage device, such as Look Up Tables (LUTs) 511. The stored optical characteristic in the second LUTs 511 can be repeatedly used to calculate the optical characteristic of any arbitrary halftone color patch.

Figure 7:
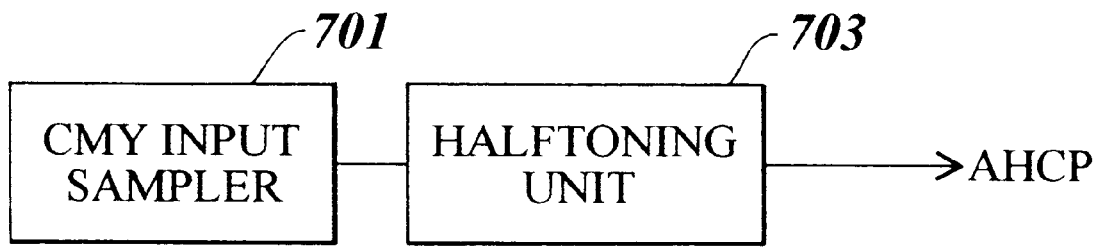
FIG. 7 is a schematic block diagram illustrating the formation of one or more arbitrary halftone color patches.

In the illustrative embodiment of the present invention, arbitrary halftone color patches (AHCPs) 513 can be generated corresponding to a halftone area of a desired optical characteristic according to a halftone algorithm. FIG. 7 is a schematic block diagram of a system for creating arbitrary halftone color patches. The arbitrary halftone color patches can be digitally created by sampling random CMY color input values with a CMY color input sampler 701. Each of the CMY inputs ranges between 0 and 255 in an 8-bit size. For example, if the CMY color input values are sampled at 0, 85, 170, and 255, respectively, 64 different CMY color inputs can be selected. Those skilled in the art will appreciate that if the CMY color input values are sampled at 0, 64, 128, 192, and 255, respectively, 125 different halftone patterns can be created.

If an arbitrary CMY color input value is determined, the corresponding halftone patch is generated according to the printer's halftone algorithm. For example, a halftoning unit 703 can employ a halftone algorithm (such as a halftone screen algorithm or an error diffusion algorithm) to process halftone patches before the patches are printed by the printer. The halftone screen algorithm typically thresholds the source image with a dither matrix. The matrix is laid repeatedly over the source image. Wherever the pixel value of the image is greater than the value in the matrix, a dot on the output image is filled. Error diffusion algorithms, on the other hand, sequentially traverse each pixel in the source image. Each pixel is compared to a threshold, and if the pixel value is higher than the threshold, a 255 is output; otherwise, a 0 is output. The error—the difference between the input pixel value and the output value—is dispersed to nearby neighbors. Error diffusion algorithm is a neighborhood operation since it operates not only on the input pixel, but also its neighbors. Generally, neighborhood operations produce higher quality results than point operations.

With reference again to FIG. 5, the arbitrary halftone color patches generated in accordance with the halftone algorithm of the printer 103 can be divided by a parser 515 into a combination of elementary halftone color patches to calculate the optical characteristic of each arbitrary halftone color patch. The optical characteristic of each arbitrary halftone color patch can be calculated or determined based on the compensated optical characteristics or values of the elementary halftone patches stored in the second look-up tables (LUTs) 511 for a set of γ values from the γ-tester 521. For example, the calculation stage 517 employs the compensated values to calculate the expected optical characteristic of the arbitrary halftone color patches. The nonlinear operations in equation 5x–5z and 6x–6z are employed only to determine the compensated values ($X_i^{\gamma_x}$, $Y_i^{\gamma_y}$, $Z_i^{\gamma_z}$) of the original 1072 elementary halftone color patches in 2-by-2 patterns and the final result of the expected (X,Y,Z) values. Since the compensated values ($X_i^{\gamma_x}$, $Y_i^{\gamma_y}$, $Z_i^{\gamma_z}$) are stored in the second LUTs 511, in many applications of this printer models, the calculation stage 517 performs only a linear operation on the values stored in the second LUTs 511 followed by an exponentiation that can be implemented by means of a look-up table.

In addition to calculating the optical characteristic of each arbitrary halftone patch, each arbitrary halftone color patch is also printed on the medium 105 by the printer 103. The optical characteristic of each arbitrary halftone color patch printed by the color printer is measured by the calorimeter 107. As described above, the resulting response of the colorimeter 107 can be the CIE X, Y, and Z tri-stimulus values, RGB values, CIE L*a*b*, or another CIE color space values.

The calculated optical characteristic of each arbitrary halftone patch determined by the calculation stage 517 is compared with the measured optical characteristic of the halftone patch by a comparator 519. The comparator 519 compares the calculated and measured values and determines the difference or error (ΔE) between the calculated optical characteristic and the measured optical characteristic of each arbitrary halftone patch. The above determined ΔE represents the difference or error between two colors, which can be evaluated as the square root of $\Delta L^{*2}+\Delta a^{*2}+\Delta b^{*2}$ in CIE La*b color space where ΔL* is the difference between the L* values for the two colors and likewise for a* and b*. This comparison and determination of the difference between the measured and calculated values corresponding to arbitrary halftone patches 513 is performed for all the halftone patches which are printed by the printer. The comparator 519 also determines an average value (Ave. ΔE) of the differences or errors between the calculated optical characteristic of the arbitrary halftone color patches and the measured optical characteristic of the arbitrary halftone color patches, a maximum values (max. ΔE) of the differences or errors between the calculated optical characteristic of the arbitrary halftone color patches and the measured optical characteristic of the arbitrary halftone color patches. These ΔE values are then returned to the γ-tester 521 to be associated with the γ value tested. By collecting the ΔE values for various Δ values tested, the γ-tester can determine which γ value works best, or which value is suitable for the system.

Figure 8:
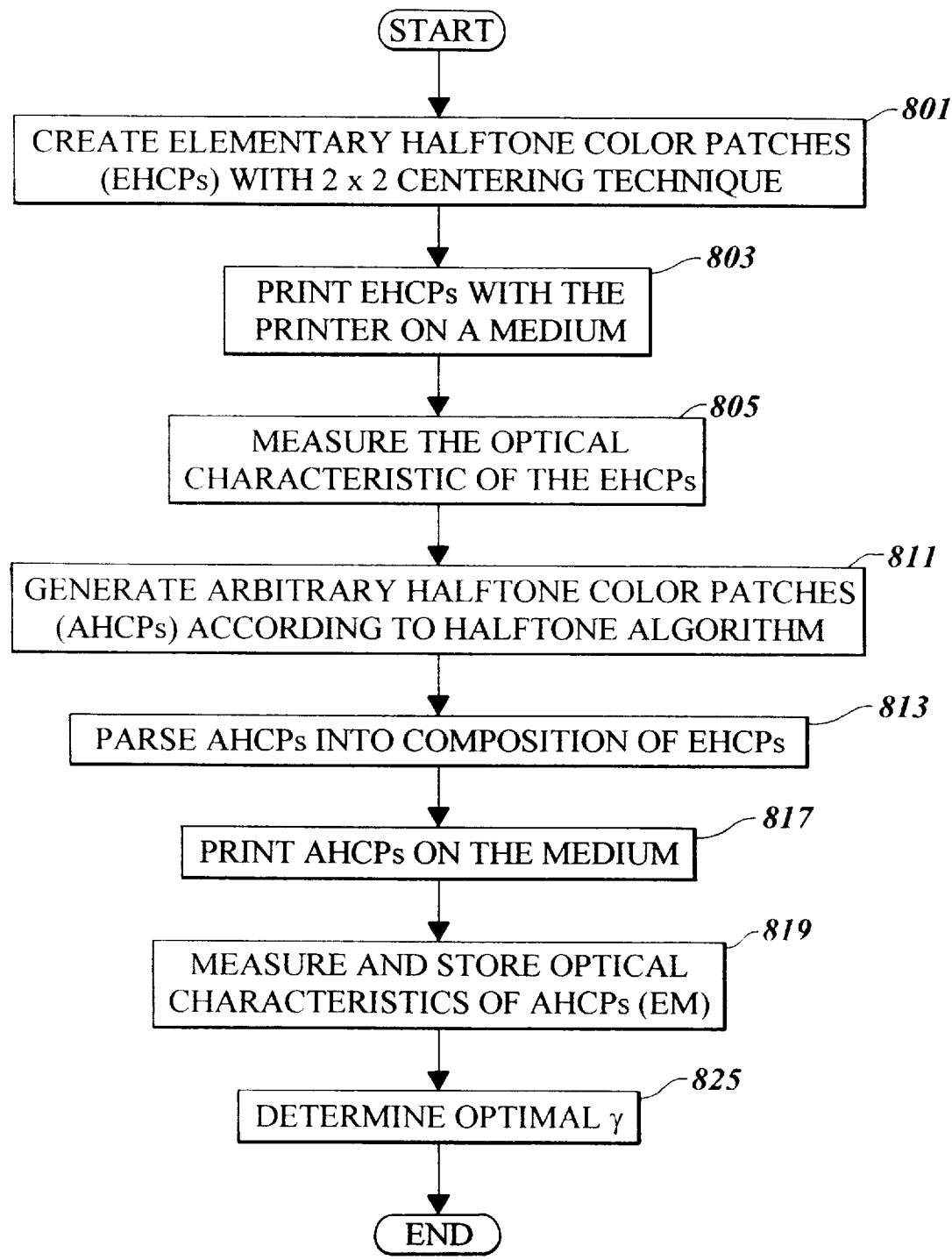
FIG. 8 is a flow chart illustrating a method for calculating a difference between a measured optical characteristic and a calculated optical characteristic of an arbitrary halftone color patch in accordance with the teachings of the present invention.

FIG. 8 is a flow chart illustrating a method for determining an optimal compensation values γ by using a difference between a measured optical characteristic and a calculated optical characteristic of an arbitrary halftone color patch in a printing system. A plurality of elementary halftone color patches (EHCPs) are generated by employing a 2-by-2 centering technique in order to characterize the printing system (step 801). In the 2-by-2 centering technique, each dot is located at the intersections of a superimposable, virtual grid. The optical characteristic of each pixel can be fully specified by the four dots located at the corners of the pixel. Therefore the total number of all overlapping possibilities is reduced to $8^4$, or 4096, by considering that each dot has eight possible inputs: cyan (C), magenta (M), yellow (Y), red (R), green (G), blue (B), black (K) and white (W), for a CMY color printer. In addition, assuming that all dots have shapes symmetric about both the vertical and the horizontal axes, for example, circles or ellipses, many overlapping patterns are mirror images of others. With this symmetry consideration, those skilled in the art will appreciate that there are only 1072 independent overlapping structures in terms of optical color characteristic. Nevertheless, those of ordinary skill in the art will appreciate that the application of the present invention is not limited to 3-color CMY printer. Those of ordinary skill in the art will also appreciate that the present invention can be practiced with a 2-color or 4-color printer and other set of elementary halftone color patches can be generated in a 2-color or 4-color printer.

A set of 1072 elementary halftone color patches are printed on a medium by the printer 103, such as a XEROX 5790™ color laser printer in 400-by-400 DPI mode, regardless of the printer's halftone algorithm (step 803). For all distinct patterns of the elementary halftone color patches, the binary signals of the halftone patches are input to the printer 103 during calibration. These binary signals are independent of the halftone algorithm of the printer 103. The printed color patches periodically repeat their corresponding 2-by-2 dot pattern in both the horizontal and vertical directions. Each printer is characterized by the manner in which it outputs these color patterns.

The optical characteristic (e.g., reflectance) of each elementary halftone color patch printed by the color printer is measured by the colorimeter 107 (step 805). The calorimeter can express the measured optical characteristic in CIE X, Y, and Z tri-stimulus values, or in some other color space value. Those skilled in the art will appreciate that the measured optical characteristic of the elementary halftone color patches can be expressed as RGB values, CIE L*a*b* values, or other CIE color space values, in accord with the appropriate choice of input parameters to the colorimeter.

The measured optical characteristics of the elementary halftone color patches are stored in a first storage element (e.g., a LUT).

The next step in the illustrative embodiment of the invention is to generate an arbitrary halftone color patches (AHCPs) according to a halftone algorithm (step 811). This color patch is digitally created by randomly sampling values of the CMY color input signals. For example, the CMY input signals are sampled at 0, 85, 170 and 255, respectively, such that 64 different arbitrary color input signals can be selected. These color inputs are processed by the halftone algorithm of the printer 103, and which can be either a halftone screen algorithm or an error diffusion algorithm.

The arbitrary halftone color patches generated in accordance with the printer's halftone algorithm are parsed, according to one practice, into a composite of elementary halftone color patches in order to calculate the optical characteristic of each of the arbitrary halftone color patches (step 813). In addition to calculating the optical characteristic of each arbitrary halftone patch, each arbitrary halftone color patch is printed on the medium by the printer 103, such as by a XEROX 5790™ color laser printer in 400-by-400 DPI mode (step 817). The optical characteristic (e.g., reflectance) of each arbitrary halftone color patch printed by the printer 103 is then measured by the colorimeter 107 (step 819). As described above, the optical characteristic of each arbitrary halftone color patch printed in each color printer can be measured in CIE X, Y, and Z tri-stimulus values, RGB values, CIE L*a*b*, or any other CIE color space values. These measured values (Em) are stored for future use.

Finally the parsed arbitrary halftone color patches and their measured values are used to determine an optimal or suitable γ value set (step 825). This step is expanded in FIG. 9.

Figure 9:
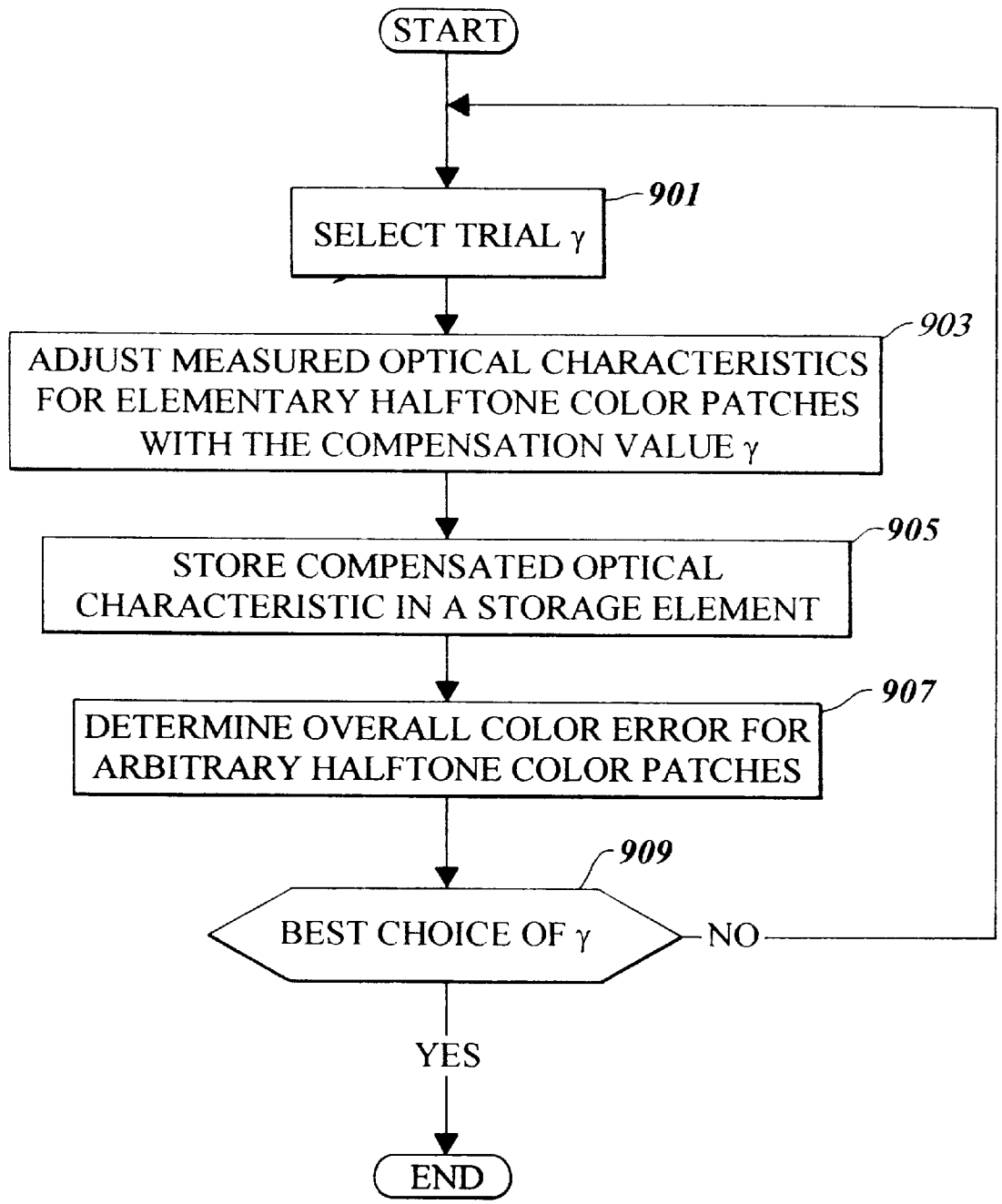
FIG. 9 is a flow chart illustrating the details of a method for determining an optimal compensation value $\gamma$.

FIG. 9 is a flow chart illustrating the preferred embodiment for determining the optimal compensation value γ. In step 901 a particular instance of γ is selected. The compensation value γ may be chosen from a table of predefined candidate values, or may be generated by any of the well-known numerical methods for determining the optimal value (such as by a binary searc or Newton's method).

For the purpose of enhancing the accuracy in predicting the optical characteristic of any arbitrary halftone color patch generated by the printer 103, the measured tri-stimulus values ($X_i$, $Y_i$, $Z_i$) of the elementary halftone color patches generated by the calorimeter 107 are altered by the compensation value γ to create compensated or adjusted tri-stimulus values ($X_i^{\gamma x}$, $Y_i^{\gamma y}$, $Z_i^{\gamma z}$) which reflect the optical scattering caused by the medium. The compensation value γ can also reflect the type of ink which is used to print the halftone color patches on the medium. These compensated tri-stimulus values are then stored in a second storage element, such as in a second set of Look-Up Tables (LUTs), as set forth in step 905. Once the optical scattering of each elementary halftone patch is determined, these values are used to calculated the expected optical characteristic of an arbitrary halftone color patch.

Figure 10:
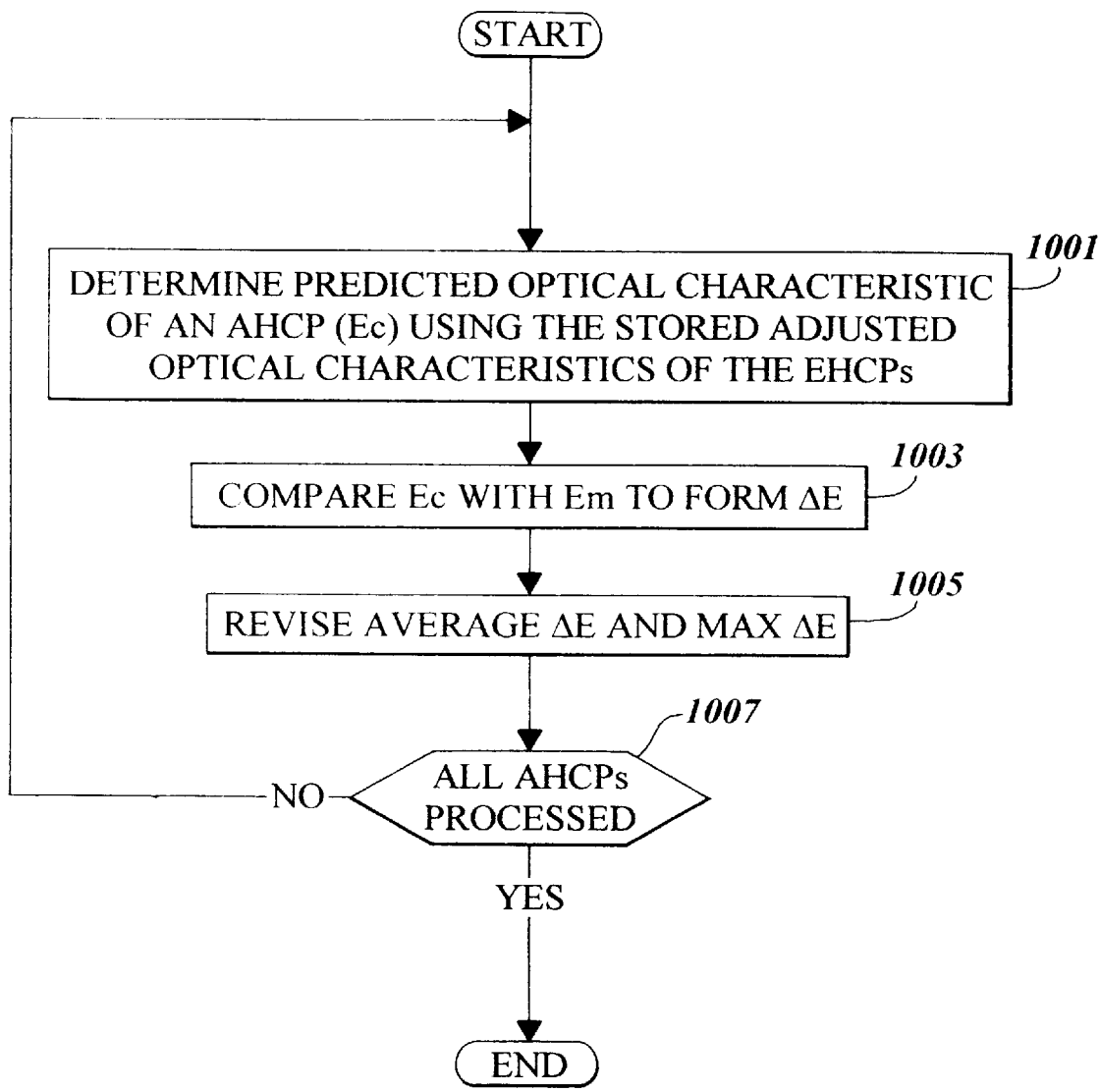
FIG. 10 is a flow chart illustrating a method for determining the overall error in an optical characteristic for a set of arbitrary halftone color patches.

Using the adjusted characteristics of table 511 and the composite of elementary halftone color patches for each arbitrary halftone color patch from step 813, the overall color error is determined in step 907, which is described further in FIG. 10. The overall error produced by a given compensation value γ is then used to determine the optimal (best) compensation value 7, and may be used to determine the next γ value to try, depending on the method employed for selecting γ values. In step 909, one decides whether or not more γ values should be tried. The details depend on the method used for selecting γ values. It may be simply a test to see if all candidate γ values have been examined, or if γ values are generated, it may test whether the error from the last examined value is small enough, or whether the improvement from the last γ adjustment is sufficiently small.

FIG. 10 is a flow chart showing the preferred embodiment for determining the overall color error for the set of arbitrary halftone color patches. In step 1001 the optical characteristic of an arbitrary halftone color patch is calculated based on the stored compensated tri-stimulus values (e.g., measured optical characteristics) corresponding to the elementary halftone color patches. For example, the optical characteristic of the arbitrary halftone color patch can be calculated by the calculation stage 517 by summing the optical characteristics of the elementary halftone color patches that are included in each arbitrary halftone color patch according to the equations 5x –5z and 6x –6z. The nonlinear operations in equations 5x –5z and 6x –6z only involve calculating the compensated tri-stimulus values $(X_i^{\gamma x}, Y_i^{\gamma y}, Z_i^{\gamma z})$ of the 1072 elementary halftone color patches in 2-by-2 overlapping patterns, in order to obtain the resultant, expected tri-stimulus values (X, Y, Z). Since the compensated tri-stimulus values $(X_i^{\gamma x}, Y_i^{\gamma y}, Z_i^{\gamma z})$ can be stored in suitable memory, in many applications, the printing system 100 can simply perform a linear operation on the 1072 elementary halftone color patches. An exponentiation must still be applied to the resulting sum, but this can be implemented by a look-up table.

The calculated optical characteristic value (Ec) of each arbitrary halftone patch is then compared with the measured optical characteristic value (Em) of the halftone patch (step 1003). The difference (ΔE) between the calculated optical characteristic value (Ec) and the measured optical characteristic value (Em) of each arbitrary halftone patch is determined. The ΔE result for a single patch is used to update the behavior for the entire set of patches, such as contributing to the average error, and/or updating the maximum error (step 1005). This comparison and determination of the difference of the arbitrary halftone patch is conducted over all the halftone patches that are printed. Step 1007 determines when all the arbitrary halftone color patches have been processed.

Figure 11:
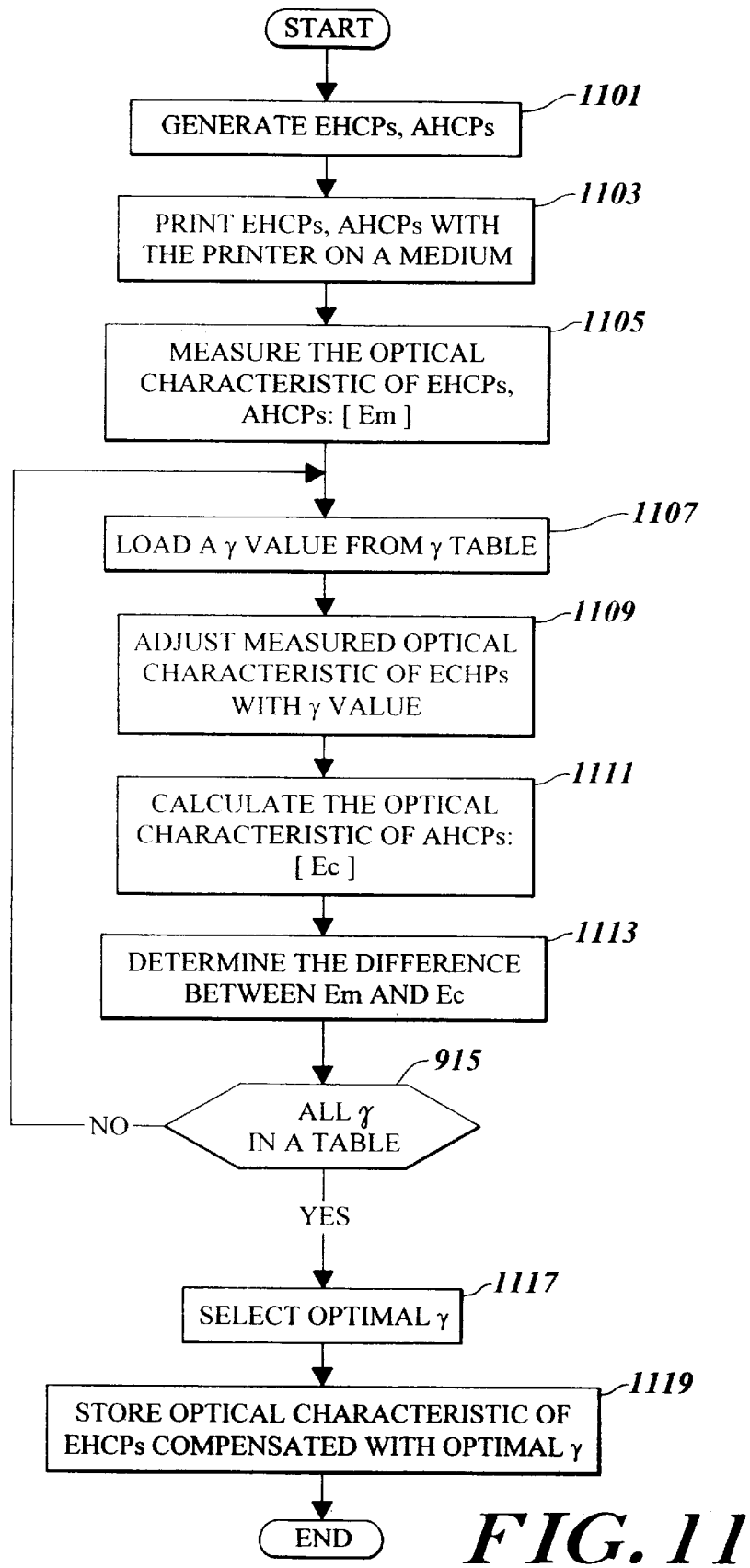
FIG. 11 is a flow chart illustrating a method for determining an optimal compensation value in accordance with the teachings of the present invention.

FIG. 11 is a flow chart illustrating an automated or computer-based method for determining an optimal compensation value for use with the printing system 100 and storing in the storage element the optical characteristic of elementary halftone color patches compensated with the optimal compensation value. In this embodiment, the optimal γ is chosed from a table of candidate γ values. A plurality of elementary halftone color (EHCPs) patches and arbitrary halftone color patches (AHCPs) are generated (step 1101) by employing a 2-by-2 centering technique and by a halftone algorithm, respectively. The elementary halftone color patches and arbitrary halftone color patches are printed on a medium by the printer 103 (step 1103). The optical characteristic (e.g., reflectance) of each elementary halftone color patch and each arbitrary halftone color patch printed by the color printer 103 is measured by the calorimeter 107 (step 1105). A compensation value table is provided to select an optimal compensation value, which includes a plurality of compensation values less than unity. A compensation value is loaded from the compensation value table (step 1107) and the measured optical characteristics of the elementary halftone color patches are adjusted or varied with the compensation value γ to reflect an optical characteristic of the medium (step 1109). For the purpose of enhancing the accuracy in predicting the optical characteristic of any arbitrary halftone color patch generated by the printer 103, the measured tri-stimulus values $(X_i, Y_i, Z_i)$ of the elementary halftone color patches generated by the calorimeter 107 are altered by the a compensation value γ to create compensated or adjusted tri-stimulus values $(X_i^{\gamma x}, Y_i^{\gamma y}, Z_i^{\gamma z})$ which reflect the optical scattering caused by the medium. The compensation value γ can also reflect the type of ink that is used to print the halftone color patches on the medium. The compensated optical characteristic values of the elementary halftone color patches are used to calculate the predicted optical characteristic of an arbitrary halftone color patch. The arbitrary halftone color patches generated in step 901 are parsed into a composite of elementary halftone color patches in order to calculate the optical characteristic of each of the arbitrary halftone color patches. The optical characteristic of each of the arbitrary halftone color patches is calculated based on the compensated measured optical characteristics corresponding to the elementary halftone color patches (step 1111). The difference or error (ΔE) between the calculated optical characteristic value (Ec) and the measured optical characteristic value (Em) of each arbitrary halftone patch is determined (step 1113). This comparison and determination of the difference of the arbitrary halftone patch is conducted over all the halftone patches that are printed. After this determination of the difference of the arbitrary halftone patch is conducted over all the halftone patches, the average difference or error (Ave. ΔE) of all the arbitrary halftone color patches is calculated. The system 100 then determines if all the compensation values are employed. If not then the system 100 re-loads another value into the calibrator 101. Steps 1107 through 1113 are repeated on the remaining compensation values in the compensation value table (step 1115). Those of ordinary skill in the art will appreciate that step 1107 through step 1113 can be conducted over all the compensation values stored in the compensation value table in a relatively time efficient manner by using a computer. Once the average differences or errors (Ave. ΔE) between the calculated optical characteristic value (Ec) and the measured optical characteristic value (Em) of the arbitrary halftone color patches over all the compensation values are determined, the system selects an optimal compensation value by comparing the average differences (step 1117). Finally, the optical characteristics of the elementary halftone color patches compensated by the optimal compensation value are stored in the storage element (step 1119).

In the examples below, different compensation values γ are employed as set forth in the table below. In the following examples, all 1072 elementary halftone color patches are printed by the printer 103. The optical characteristics of the printed elementary halftone color patches are measured in CIE XYZ tri-stimulus values using a calorimeter and stored in the Look-Up Tables. The CMY input signals of the arbitrary halftone color patches introduced to the printer 103 are sampled at 0, 85, 170, 255, respectively, and 64 different CMY color inputs are chosen. Three clustered halftone screens are chosen for cyan (C), magenta (M) and yellow (Y), respectively, for a halftone screen algorithm as described above in the illustrative embodiment of the present invention. 64 different CMY color inputs are halftoned by clustered halftone screens and the corresponding halftone color patches are printed by the printer 103. The optical color characteristic of the 64 halftone color patches are measured in CIE L*a*b* values using the calorimeter 107. For each of the 64 halftone color patches, the optical characteristic is calculated in CIE XYZ tri-stimulus values by summing the optical characteritics of the elementary halftone color patches which are included in the halftone color patch. The calculated optical characteristic values of the 64 halftone color patches expressed in CIE XYZ tri-stimulus values are converted into CIE L*a*b* values. The difference or error between the calculated and measured values of the optical characteristic for each 64 halftone color patch is represented by the value ΔE. The results using different compensation values γ are set forth in the table below.

| No. | $1/\gamma_x$ | $1/\gamma_y$ | $1/\gamma_z$ | Ave. ΔE | Max. ΔE |
|---|---|---|---|---|---|
| 1 | 1.0 | 1.0 | 1.0 | 49 | 12.4 |
| 2 | 1.75 | 1.75 | 1.75 | 3.0 | 6.7 |
| 3 | 2.0 | 2.0 | 2.0 | 3.1 | 6.5 |
| 4 | 2.25 | 2.25 | 2.25 | 3.2 | 7.0 |
| 5 | 1.9 | 2.1 | 1.9 | 3.0 | 5.8 |

The difference or error (ΔE) between the measured and the predicted optical characteristic of a test patch is an objective measurement of color difference in predicting output colors in a color printer, which can be evaluated as the square root of $\Delta L^{*2}+\Delta a^{*2}+\Delta b^{*2}$ in CIE La*b color space where ΔL* is the difference between the L* values for the two colors and likewise for a* and b*. In run No. 1, the compensation values $\gamma_x$, $\gamma_y$, and $\gamma_z$ are equal to unity. This compensation value produced an average ΔE value of 4.9 a maximum ΔE value of 12.1. These values correspond to print images that do not accurately reflect the optical scattering in the medium. Hence, the input image is not reproduces with suitable accuracy. According to run Nos. 2 through 5, compensation values less than unity are employed, such as for example, 1/γ=1.75, 1γ=2.0, 1/γ=2.25, and $1/\gamma_x$=1.9, $1/\gamma_y$=2.1 and $1/\gamma_z$=1.9. Those compensation values result in a average and maximum ΔE values that are significantly better than the unity compensation value. Hence, the accuracy in predicting the color output of the arbitrary halftone color patches is significantly improved relative to run No. 1 by considering the optical scattering in the medium by employing compensation values $\gamma_x$, $\gamma_y$, and $\gamma_z$ values less than unity. In particular, the average difference or error (Ave. ΔE) between the measured optical characteristic and the predicted optical characteristic of the test patches and the maximum difference or error (Max. ΔE) between the measured optical characteristic and the predicted optical characteristic of the test patches are improved from 4.9 and 12.4to 3.0 and 5.8 with compensation values $\gamma_x$, $\gamma_y$ and $\gamma_z$ set around 0.5. As a result, the calibration of the color printer can be performed with high efficiency because of the improved accuracy in predicting halftone color outputs.

It is apparent that there has been provided, in accordance with the present invention, a method and system for calibrating a color printer. While this invention has been described in conjunction with illustrative embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for calibrating a color printer, said method comprising the steps of
   (a) providing a set of elementary halftone color patches printed by the color printer on a medium,
   (b) measuring an optical characteristic of the elementary halftone color patches,
   (c) representing an arbitrary halftone color patch with a composite of the elementary halftone color patches,
   (d) selecting an optical characteristic adjustment parameter γ, by minimizing an overall error in an optical characteristic for at least one arbitrary halftone color patch,
   (e) calculating the overall error in an optical characteristic for at least one adjustment parameter γ,
   (f) selecting the adjustment parameter γ that achieves the minimum overall error in the optical characteristic, and
   (g) adjusting the measured optical characteristic of the elementary halftone color patches with said adjustment parameter γ to reflect an optical characteristic of the medium and to compensate for said optical characteristic of said medium.

2. The method of claim 1, wherein the selecting step comprises the steps of calculating the overall error in an optical characteristic for at least one adjustment parameter γ, and selecting the adjustment parameter γ that achieves the minimum overall error in the optical characteristic.

3. The method of claim 1, wherein the calculating step comprises the steps of determining the error for an arbitrary halftone color patch, and combining the results of each determining step.

4. The method of claim 3, further comprising the step of determining the average error value of said optical characteristic.

5. The method of claim 3, further comprising the step of determining the maximum error value of said optical characteristic.

6. The method of claim 3, wherein the step of determining comprises the steps of
   parsing at least one of said arbitrary halftone color patches into a composition of elementary halftone color patches,
   adjusting the optical characteristics of the elementary halftone color patches with said adjustment parameter γ,
   calculating the optical characteristic of the at least one arbitrary halftone color patch from the adjusted optical characteristics of said composition of elementary halftone color patches, and
   determining the difference between the calculated optical characteristic and the measured optical characteristic for the at least one arbitrary halftone color patch.

7. The method of claim 1, further comprising the step of employing a 2×2 centering technique to generate said set of elementary halftone color patches.

8. The method of claim 1, wherein said adjustment parameter $\gamma$ is less than unity.

9. The method of claim 8, further comprising the step of providing different $\gamma$ values to select an optimal adjustment parameter $\gamma$.

10. The method of claim 1, wherein said calculating step further comprises the step of determining the optical characteristic of the arbitrary halftone color patch in response to the adjusted optical characteristic of the elementary halftone color patches.

11. The method of claim 1, wherein said calculating step further comprises the step of summing the optical characteristics of the elementary halftone color patches that compose the arbitrary halftone color patches in accordance with a halftone algorithm of said color printer.

12. A method for characterizing an optical characteristic adjustment parameter $\gamma$, said method comprising steps of:

measuring an optical characteristic of a plurality of elementary halftone color patches printed on a medium;

compensating for an optical characteristic of at least said medium by altering with said adjustment parameter $\gamma$ a value associated with said optical characteristic of said elementary halftone color patches;

calculating an optical characteristic of a plurality of arbitrary halftone color patches created according to a halftone algorithm based on the compensated optical characteristics of said elementary halftone color patches;

measuring optical characteristic of said arbitrary halftone color patches printed on the medium; and determining the difference between said calculated optical characteristic of said arbitrary halftone color patches and said measured optical characteristic of said arbitrary halftone color patches in order to characterize said adjustment parameter.

13. The method of claim 12 further comprising the steps of:

determining an average value (Ave. $\Delta E$) of the differences between said calculated optical characteristic of said arbitrary halftone color patches and said measured optical characteristic of said arbitrary halftone color patches; and selecting the adjustment parameter $\gamma$ that minimizes said average value.

14. The method of claim 12, further comprising the steps of:

determining a maximum (max. $\Delta E$) of the differences between said calculated optical characteristic of said arbitrary halftone color patches and said measured optical characteristic of said arbitrary halftone color patches; and selecting the adjustment parameter $\gamma$ that minimizes said maximum value.

15. The method of claim 12, wherein said each of said elementary halftone color patches represent a pattern of dots, and further comprising the step of locating said dots of said elementary halftone color patches at intersections of a virtual, superimposable grid.

16. The method of claim 12, wherein said color printer comprises a CMY color printer, and said elementary halftone color patches include 1072 color patches.

17. The method of claim 12, wherein said halftone algorithm comprises one of a halftone screen algorithm and an error diffusion algorithm.

18. The method of claim 12, wherein said value associated with said optical characteristic of said elementary halftone color patches comprises tri-stimulus values $X_i$, $Y_i$, $Z_i$, and the step of compensating comprises the step of converting said tri-stimulus values $X_i$, $Y_i$, $Z_i$ to compensated tri-stimulus values $X_i^{\gamma_x}$, $Y_i^{\gamma_y}$, $Z_i^{\gamma_z}$.

19. The method of claim 18, further comprising the step of adjusting said $\gamma_x$, $\gamma_y$, $\gamma_z$, values to select an optimal adjustment parameters $\gamma_x$, $\gamma_y$, $\gamma_z$.

20. The method of claim 18, wherein said $\gamma_x$, $\gamma_y$, $\gamma_z$ values are less than unity.

21. The method of claim 12, further comprising the step of selecting an optimal adjustment parameter that minimizes an overall difference in an optical characteristic for at least one arbitrary halftone color patch for compensating for the optimal characteristic of at least the medium.

22. The method of claim 12, wherein said calculating step further comprises the step of determining said optical characteristic (X, Y, Z) of said arbitrary halftone color patches according to the following equations:

$$X^{\gamma_x} = \Sigma n_i X_i^{\gamma_x}/N;$$

$$Y^{\gamma_y} = \Sigma n_i Y_i^{\gamma_y}/N; \text{ and}$$

$$Z^{\gamma_z} = \Sigma n_i Z_i^{\gamma_z}/N;$$

wheresaid $X^{\gamma_x}$, $Y^{\gamma_y}$, $Z^{\gamma_z}$ are compensated optical characteristic values of said arbitrary halftone color patches, said $X_i^{\gamma_x}$, $Y_i^{\gamma_y}$, $Z_i^{\gamma_z}$ are compensated optical characteristic values of said elementary halftone color patches which are included in each arbitrary halftone color patch, N is the total number of pixels in a 2-by-2 overlapping structure and $n_i$ is the total number of occurrences of each elementary halftone color patch in a 2-by-2 overlapping structure and all corresponding symmetric images.

23. The method of claim 12, wherein said calculating step further comprises the step of sampling random values of input color signals to create the arbitrary halftone color patches.

24. A printing system suitable for calibrating a digital color printer, said system comprising:

a storage element for storing an optical characteristic of a plurality of elementary halftone color patches printed on a medium;

a compensator for converting said optical characteristics of said elementary halftone color patches into a compensated optical characteristic value in response to a compensation value;

a calculation stage for calculating an optical characteristic value of a plurality of arbitrary halftone color patches created according to a halftone algorithm in response to said compensated optical characteristic value of the elementary halftone color patches, a measuring element for measuring an optical color characteristic value of the arbitrary halftone color patches printed on a medium; and a comparator for comparing the calculated optical characteristic value of the arbitrary halftone color patches with the measured optical characteristic value of the arbitrary halftone color patches to characterize said compensation value.

25. The system of claim 24 further comprising:

means for determining a difference between the calculated and the measured optical characteristic values of the arbitrary halftone color patches; and means for selecting an optimal compensation value that minimizes an overall difference in an optical characteristic for at least one arbitrary halftone color patch.

26. The system of claim 25 wherein said compensator comprises means for altering tri-stimulus values $(X_i, Y_i, X_i)$ associated with said elementary halftone color patches to compensated values $(X_i^{\gamma_x}, Y_i^{\gamma_y}, Z_i^{\gamma_z})$ according to the compensation values $\gamma_x, \gamma_y, \gamma_z$.

27. The system of claim 26, wherein said compensation values $\gamma_x, \gamma_y, \gamma_z$ are less than unity.

* * * * *